May 26, 1942.  W. H. SILVER  2,284,172
DAMMING DEVICE
Filed Feb. 9, 1940  2 Sheets-Sheet 2
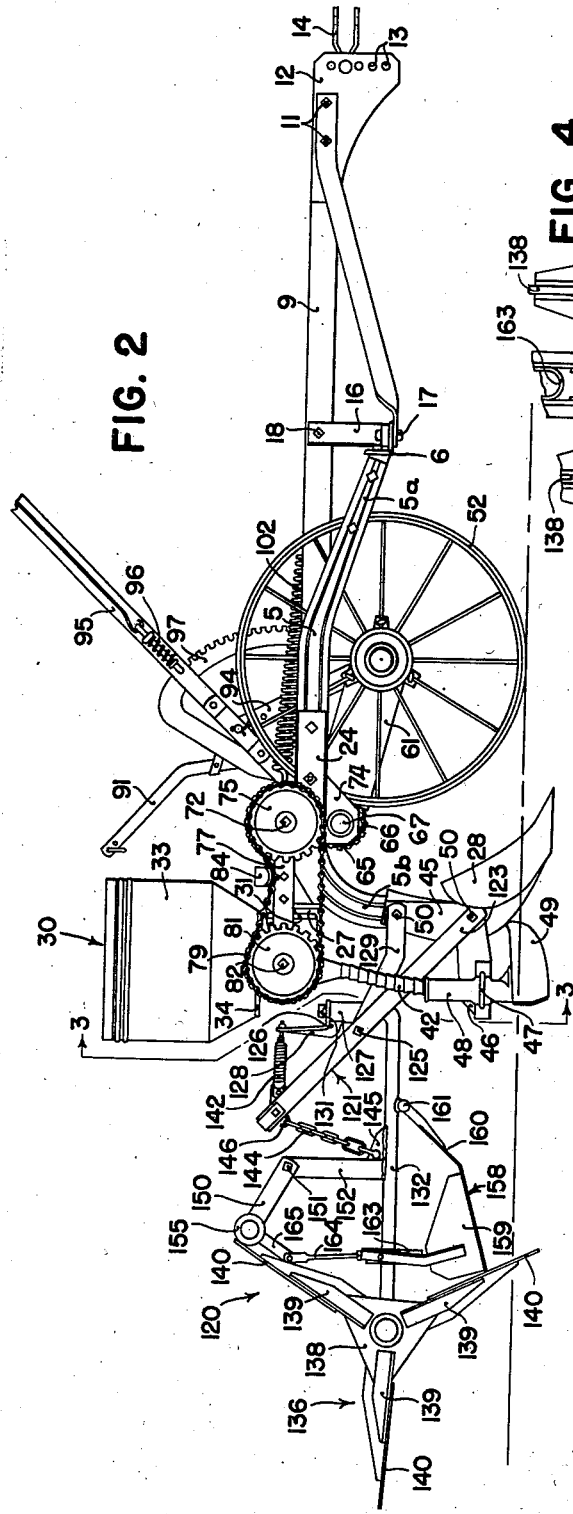
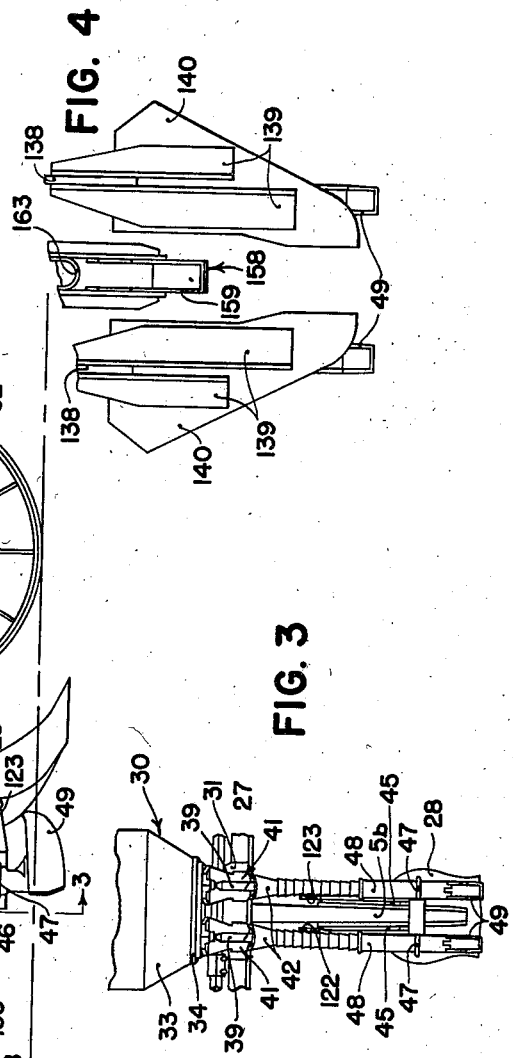
INVENTOR.
WALTER H. SILVER
BY
ATTORNEYS.

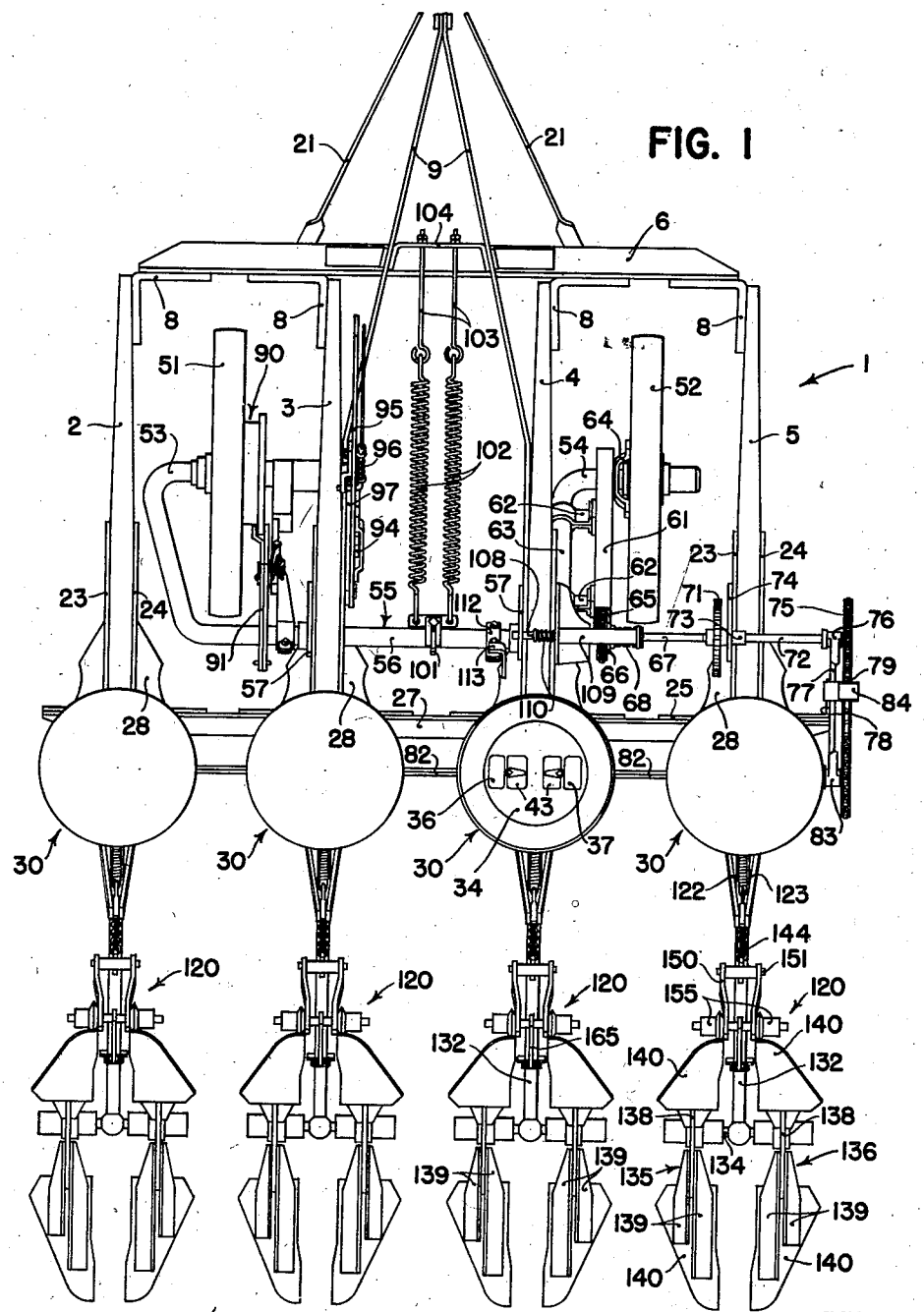

Patented May 26, 1942

2,284,172

UNITED STATES PATENT OFFICE 2,284,172

DAMMING DEVICE

Walter H. Silver, Moline, Ill., assignor to Deere & Company, Moline, Ill., a corporation of Illinois Application February 9, 1940, Serial No. 318,069

7 Claims. (Cl. 97—55)

The present invention relates generally to agricultural implements and is more particularly concerned with machines for forming moisture-retaining dams for the purpose of conserving available moisture and reducing erosion by surface water and wind.

The object and general nature of the present invention is the provision of an agricultural machine of this character in which both the planting and dam forming operations are performed simultaneously, and further it is a feature of this invention to provide a machine for performing this dual function, so constructed and arranged that the dam forming units are normally positioned relative to the planting units that the moisture-retaining dams are formed without in any way disturbing the deposited seed or interfering with the planting means. More particularly, it is a feature of this invention to arrange the dam forming means so that not only do they serve to form the desired dams but, in addition, they also serve as covering means for the planting units directing soil into the furrows opened by the planter runners.

Another important feature of this invention is the provision of a planting unit having means for depositing two parallel rows of seed, and especially is it a feature of this invention to provide a damming unit which not only forms well-packed dams at frequent intervals that will hold heavy rains, but the damming means is arranged in such relation to the two rows of seed that the blade or blades of the damming unit operate generally between and above the two rows of seed.

It is an additional feature of the present invention to provide a damming unit which is especially adapted for attachment to a lister that is equipped with planting mechanism, and especially is it a feature of this invention to provide a damming attachment particularly adapted to be connected with or mounted on a lister in which the associated planting unit has means for depositing two generally parallel laterally spaced rows of seed.

These and other objects and advantages of the present invention will be apparent to those skilled in the art after a consideration of the following detailed description of the preferred structure which is illustrated in the accompanying drawings.

In the drawings:

Figure 1 is a top or plan view of an agricultural machine in which the principles of the present invention have been incorporated and in which the operations of listing, planting and forming dams have been combined;

Figure 2 is a side view of the machine shown in Figure 1;

Figure 3 is a rear view looking forwardly, generally along the line 3—3 of Figure 2, of one of the planting units; and Figure 4 is a fragmentary view illustrating the relation between the damming blades and the two associated laterally spaced seed tubes.

Referring now more particularly to Figures 1 and 2, the frame of the machine is indicated in its entirety by the reference numeral 1 and comprises a plurality of lister beams 2, 3, 4 and 5, a front transverse bar 6 to which the front ends of the beams are connected by angle members 8, and a pair of generally longitudinally extending draft bars 9 which at their rear ends are fixed in any suitable manner to the inner faces of the two inside beams 3 and 4 and at their forward ends are fixed, as by bolts 11, to a hitch plate 12. The latter is provided with a plurality of holes 13 to receive a draft clevis 14 in any one of a plurality of vertically adjusted positions. Ordinarily, the front end of the machine is supported by the clevis 14 on a tractor or other propelling vehicle, the lister planter and dam forming means forming the propelled vehicle. As shown in Figure 2, the front end of each of the lister beams 2, 3, 4 and 5 extends downwardly and forwardly, as indicated at 5a, and a pair of generally vertical angle members 16 have horizontal legs which are bolted, as at 17, to the horizontal flange of the transverse angle member 6, the vertical legs of the members 16 being bolted, as at 18, to the intermediate portion of the longitudinal frame bars 9. Diagonal braces 21 are connected at their rear ends to the transverse frame bar 6 and at their forward ends are connected by the bolts 11 to the vertical hitch plate 12.

The rear end of each of the lister beams is curved downwardly, as at 5b in Figures 2 and 3, and to each beam above the curved portion 5b thereof a pair of plates 23 and 24 are bolted or otherwise fixed thereto. The rear end of each of the plates 23 and 24 is bent laterally, as at 25, (Figure 1) and is bolted or otherwise secured to a rear transverse draft or frame bar 27, preferably in the form of an angle member. Thus, the bar 27 ties together the rear portions of the lister beams 2, 3, 4 and 5. A lister bottom 28 is fixed in any suitable manner to the lower end of each curved beam section 5b.

A plurality of planting units, one for each beam and each indicated by the reference numeral 30, are fixed to the rear portion of the frame 1. To this end the transverse frame bar 27 has a plurality of plates 31 fixed to the vertical flange of the bar 27. Each planting unit 30 consists of a seed container 33 fixed at its lower portion to a supporting frame or base 34, each base 34 having a lug (not shown) which is adapted to be bolted to the upper portion of the associated supporting plate 31. As best shown in Figure 1, each supporting frame or base 34 is provided with two laterally spaced seed receiving openings 36 and 37, and disposed in each opening is a seed feed 39, of the type commonly known as a double-run feed, which is substantially like that shown in the patent to Van Brunt No. 1,639,317, dated August 16, 1927, to which reference may be had if necessary. Briefly, each seed feed 39 includes a feed wheel which is smaller in diameter on one side than the other, one side having smaller seed cells than the other for handling various sizes of seed. Each seed wheel operates in the casting fixed to the associated base or support 34, and each casting, which is indicated by the reference numeral 41, has means to receive the upper end of a seed tube 42. As best shown in Figure 3, the two seed feeds are fixed to the base support 34 in laterally spaced relation, whereby the two associated seed tubes 42 extend downwardly therefrom also in laterally spaced apart relation. A gate 43 (Figure 1) may be disposed at one side or the other of the associated seed opening 39 for adjusting the planting mechanism to the type or size of seed to be deposited. A pair of L-shaped brackets 45 are fixed to the opposite sides of each lister beam section 5b generally rearwardly of the associated lister bottom 28, the members 45 being arranged so that the horizontal portion 46 thereof extends generally rearwardly. This portion of each bracket 45 carries a U-bolt 47 which serves to clamp the shank 48 of a planter furrow opener 49 to the associated supporting bracket 45. The seed tubes 42 of each pair are received by the upper portion of the two associated runner shanks 48. The two brackets 45 associated with each lister beam are bolted thereto by any suitable means, such as bolts 50 best shown in Figure 2.

The rear portion of the implement frame is supported on and the various planting units are driven by ground wheel means which will now be described.

A pair of ground wheels 51 and 52 are mounted for rotation, respectively, on axles 53 and 54 which, taken together, constitute a crank axle structure indicated in its entirety by the reference numeral 55 and which includes a generally horizontal portion 56 which is supported for rocking movement by a pair of brackets 57 fixed to the inner lister beams 3 and 4. Preferably, although not necessarily, the two axle sections 53 and 54 are formed integrally with the horizontal portion 56. A chain housing 61 is fixed by brackets 62 to the crank axle section 63, and the ground wheel 52 carries a sprocket 64 around which a chain 65 is trained. The upper end of the chain 65 is trained over a sprocket 66 which is mounted for rotation on a cross shaft 67. A clutch 68 operatively connects the sprocket 66 to the shaft 67, and a gear (not shown) on the outer end of the latter meshes with another gear 71 which is fixed to the inner end of a shaft 72 journaled in a suitable bearing 73 carried by a bracket 74 that is fixed to the inner face of the right hand outer lister beam 5. The outer end of the shaft 72 carries a sprocket 75 and is supported for rotation in a bearing 76 fixed to a longitudinally disposed plate 77 which is carried at the right hand end of the transverse angle bar 27, as by a clip 78. A chain 79 is trained around the sprocket 75 and also around another sprocket 81 which is fixed to the outer end of a seeding shaft 82 which is journaled in a bearing 83 (Figure 1) fixed to the rear end of the supporting plate 77. A chain tightener 84 is fixed to the plate 77. The seeding shaft 82 extends through the several units 30 to the left side of the machine, and may be a single shaft or a plurality of shaft sections suitably connected together by sleeves or the like. It will be understood that the feed wheels mentioned above are fixed to rotate with the shaft or shaft sections 82.

The implement frame 1 is raised to transport position by swinging the crank axle structure 55 about the axis of the horizontal portion 56 thereof, and to this end the left hand ground wheel 51 is provided with a half-revolution clutch unit 90 of conventional construction, embodying driving and driven members, the driving member being fixed to rotate with the ground wheel 51 and the driven member optionally clutched thereto under the control of a trip lever 91. The driven member includes a crank (not shown) which is connected by a link 94 with an adjusting lever 95. The latter carries suitable latch mechanism 96 which cooperates with a sector 97 that is fixed to the inner face of the inner left-hand lister beam 3. Whenever the lever 91 is tripped, the driving and driven parts of the half-revolution clutch 90 are engaged and the forward rolling of the ground wheel 51 reacts through the above-mentioned crank and said link 94, which is latched to the frame 1 by the lever 95, to cause the crank axle 55 to swing downwardly. This raises the implement frame. An arm 101 is fixed to the central portion of the crank axle 95 and is arranged to extend upwardly. The outer end of the arm 101 is connected by a pair of springs 102 and associated adjusting links 103 to a bracket 104 that is bolted to the longitudinal frame bars, preferably by the bolts 18 which fix the upper ends of the braces 16 (Figure 2) to the longitudinal bars 9 of the frame 1. The force of the springs 102 aids in raising the implement into its transport position.

The clutch 68, which connects and disconnects the seeding drive shaft 82, is controlled by a transversely shiftable rod 108 carried in a supporting member 109 that, in turn, is carried by the bracket 57 and the bracket in which the inner end of the shaft 67 is journaled. A spring 110 serves normally to engage the clutch, and an arm 112 fixed to the horizontal portion of the crank axle section 56 carries a cam member 113 which, when the crank axle 55 is swung downwardly to raise the implement, engages the inner end of the rod member 108 and disengages the clutch, thereby disconnecting the drive from the right-hand ground wheel 52 to the various seeding units.

As best shown in Figure 1, a damming unit 120 is connected with the frame 1 substantially directly behind each of the seeding units 30. The several units 120 are substantially identical, and hence a description of one will suffice.

A hitch bracket 121 is fixed to the associated lister beam in generally upwardly and rearwardly extending relation and consists of a pair of bars 122 and 123 diverging forwardly and apertured, the forward ends being disposed on opposite sides of the L-shaped brackets 45 and secured in place by the bolt 50 which fixes the two brackets 45 in position. Intermediate their ends the two bars 122 and 123 are apertured to receive a pivot bolt 125 which supports a hitch swivel 126 in the form of a casting having a vertical sleeve portion 127 and an upstanding lug 128. The pivot bolt 125 also receives the rear ends of a pair of braces 129 which are bolted at the forward ends to the upper bolt 50. The hitch bracket just described is therefore rigidly secured to and forms a rearwardly extending part of the associated lister beam. It will be noted, particularly from Figure 3, that the two bars 122 and 123 extend rearwardly between the two associated seed tubes 42.

The sleeve section 127 of the hitch pivot receives the upturned end 131 of a frame bar 132 that extends generally rearwardly. At its rear end the frame bar 132 is provided with a transverse stub shaft section upon which a pair of rotatable scraper blade assemblies 135 and 136 are mounted. Each assembly consists of a spider that is made up of a plate 138 and three pairs of angle arms 139 suitably secured thereto, as best shown in Figure 2. To each pair of arms 139 there is secured a scraper blade 140 having the configuration shown in Figure 1 and in Figure 4.

Each damming unit is capable of vertical rocking movement about the axis of the pivot bolt 125 and is also capable of lateral swinging movement about the axis of the upturned frame bar end 131. A spring 142 is adjustably anchored at its forward end to the upper end of the lug 128 and at its rear end is connected to the upper end of the hitch bracket 121. A chain 144 is anchored at its upper end to the upper end of the hitch bracket 121 and at its lower end the chain is connected to a plate 145 that is welded or otherwise fixed to the central part of the frame bar 132. As will be seen from Figure 2, the spring 142 biases the damming unit 120 for movement in a counterclockwise direction about the pivot 125, but movement in this direction is limited by the chain 144. Preferably, the connection of the latter at its upper end with the upper end of the hitch bracket 121 includes a hook 146 whereby any one of several links of the chain 144 may be engaged so as to hold the damming unit 120 in various vertical positions. The chain 144 also serves to return the damming unit 120 to its rearwardly extending position since lateral horizontal swinging movement of the unit has the effect of causing the chain 144 to raise the unit slightly.

Each of the rotatable damming unit assemblies is held against rotation by a trip arm 150 which is pivotally mounted, as at 151, to the upper end of a strut 152 which is welded to the frame bar 132 adjacent the chain receiving plate 145. The outer or rear end of the trip arm 150 carries a pair of rollers 155 against which the ends of the upper blades bear, as shown in Figure 2. The angle that the arm 150 makes with respect to the plane of the two upper blades 140 is substantially a right angle, whereby as long as the arm 150 is held in the position shown in Figure 2, the damming blades are held against rotation.

A gauge float 158 comprising an earth engaging member 159 and a bar 160, is pivoted, as at 161, to a part that is fixed to the frame bar 132. The rear end of the earth engaging member 159 carries a U-shaped part 163 which embraces the frame bar 132 and at its upper end is adjustably connected, as by a screw-threaded link 164, to an arm 165 which is fixed to the trip arm 150. When the dam which is formed by earth accumulating in front of the lower blades 140, reaches a height such that the gauge float 158 is forced upwardly, this movement disengages the rollers 155 from the upper blades 140, whereupon the rotatable damming blade assemblies 135 and 136 will rotate, swinging the upper blades 140 down into engagement with the ground and passing over the dam just formed. Changing the adjustment between the link 164 and the cooperating part 163 has the effect of raising and lowering the earth engaging section 159, and thus determining the size of dam which must be formed before the damming unit is tripped.

Figure 4 illustrates the relation between each planting unit 30 and the associated damming unit 120. It will be noted that the two damming blades 140 are carried so that they engage the soil inwardly and above the lower portions of the planter runners 49 through which the seed is deposited in two laterally spaced rows in the ground. Normally, the two planter runners 49 of each unit 30 are spaced from seven to nine inches apart and the lower tips of the damming blades 140 are arranged to work the soil about two inches above the two rows of seed. From Figure 2 it will be noted that the damming blades serve as coverers for the associated two planter runners 49. Not only do the blades 140 thus erect dams but, in addition, they fill in the furrows opened by the runners 49 and form and pack the soil about the two rows of seed. Adjusting the spring 142 varies the force with which the associated damming unit normally is held to its work, and raising or lowering the frame bar 132 relative to the hitch bracket 121 determines the number of dams for any given distance of travel. The damming unit is also capable of lateral swinging movement and thereby accommodates deviations from straight line travel.

While I have shown and described above the preferred structure in which the principles of the present invention have been incorporated, it is to be understood that my invention is not to be limited to the particular means shown and described above, but that, in fact, widely different means may be employed in the practice of the broader aspects of my invention.

What I claim, therefore, and desire to secure by Letters Patent is:

1. An agricultural machine comprising a planter including a plurality of planting units, each having means for planting two rows, and a plurality of dam forming means, one for each of said units, arranged to operate in predetermined relation with respect to the associated rows.

2. An agricultural machine comprising a planting unit having a pair of laterally spaced seed depositing means for simultaneously depositing two rows of seeds, and dam forming means connected with said unit in a position rearwardly of and adapted to work the soil generally between said spaced apart seed depositing means.

3. An agricultural machine comprising planting mechanism including two transversely spaced furrow opening means, and damming means connected therewith substantially in a position between the generally vertical longitudinal planes of said spaced furrow opening means.

4. An agricultural machine comprising planting mechanism including a seed container and two seed depositing means associated therewith and adapted to deposit seed in two laterally spaced rows, and dam forming means connected therewith in a position to engage the soil substantially between said rows.

5. An agricultural machine as defined in claim 4, further characterized by said dam forming means including a pair of laterally spaced apart earth-engaging blades, and means for supporting said blades in a position to engage the soil both laterally inwardly and above said rows.

6. An agricultural machine comprising means serving as a frame and including a lister beam, a lister bottom fixed thereto, a seed container supported on said frame, a pair of laterally spaced runners fixed to said lister beam rearwardly of said lister bottom and in laterally spaced apart relation, a pair of seed tubes extending downwardly from said container to said runners, a bracket fixed at its forward portion to said lister beam and extending generally rearwardly between said seed tubes, dam forming means movably connected with said bracket, and means associated therewith for holding said dam forming means in a position centrally rearwardly of said spaced apart runners.

7. An agricultural machine comprising means serving as a frame, planting mechanism including a seed container, a pair of laterally spaced runners and a pair of seed tubes extending from said container to said runners to conduct seed thereto, bracket means comprising a pair of bars connected at the forward ends with said frame and extending generally rearwardly alongside said seed tubes, and a dam forming unit including blade means adapted to engage the ground rearwardly of said runners and supporting means for said blade means connected with said generally rearwardly extending bars.

WALTER H. SILVER.